July 11, 1950     A. THIBEAUX     2,514,526
BEARING
Filed Aug. 28, 1947
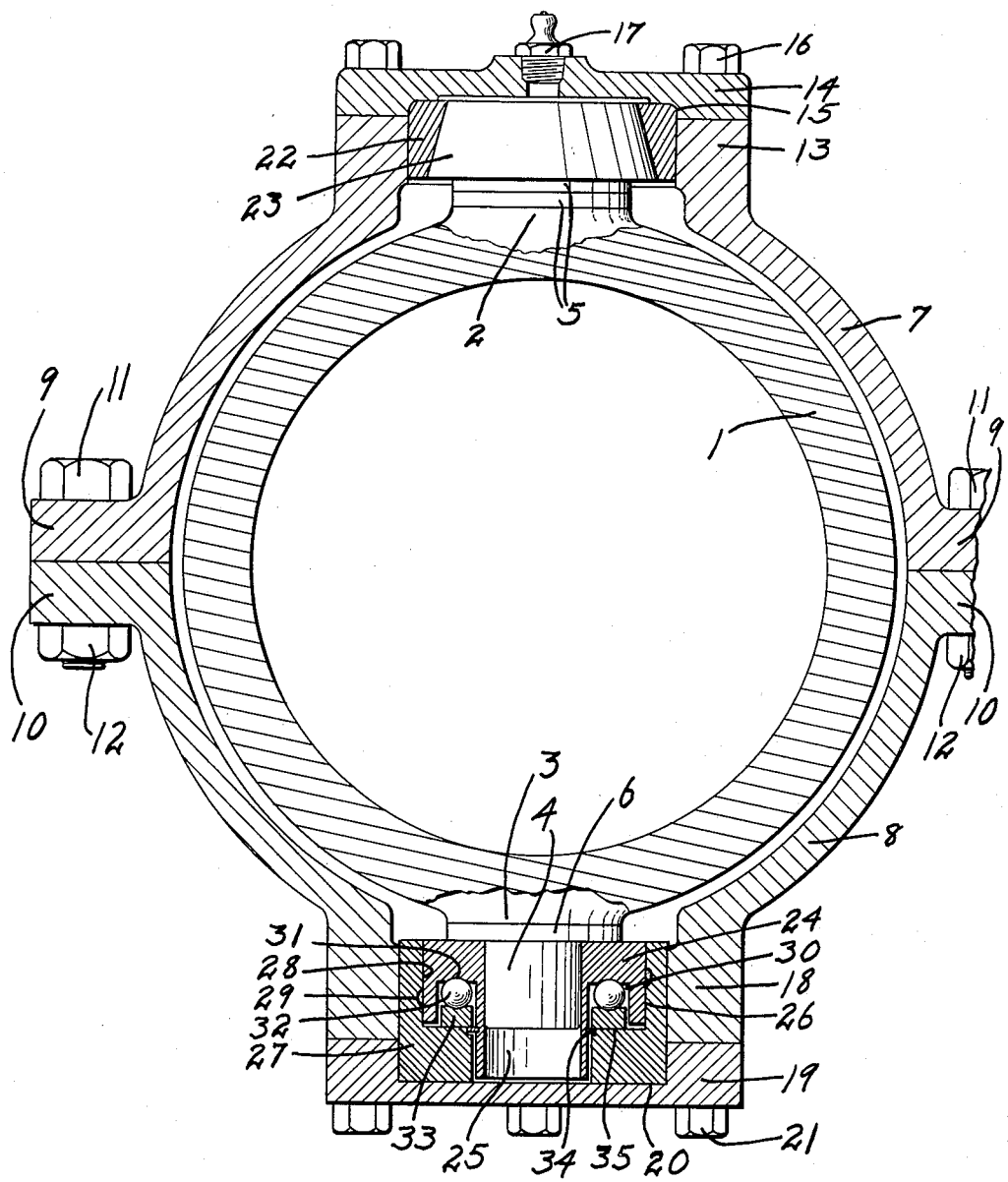
ALBERT THIBEAUX.
INVENTOR Patented July 11, 1950

2,514,526

UNITED STATES PATENT OFFICE 2,514,526

BEARING

Albert Thibeaux, Freeport, Tex.

Application August 28, 1947, Serial No. 771,069

6 Claims. (Cl. 308—219)

This invention relates to bearings and has for its general object the provision of an efficient bearing for taking both thrust and radial loads.

Numerous bearings have been designed for the purpose of taking both thrust and radial loads but such bearings which have been designed in the past have been in the nature of friction bearings in which the bearing surfaces slide over each other or anti-friction bearings in which the bearing surfaces roll over each other. In some cases such as for example in the case of bearings used on the king pins which mount the stub shafts for steered wheels of motor vehicles, the thrust load is very high and it is highly desirable that the bearing provide anti-friction means for taking this thrust load in order to promote ease of steering.

Previously designed bearings for this purpose have in many cases taken the form of tapered roller bearings in which a single set of rollers takes both the radial load and the thrust load.

However, it has been found that such tapered roller bearings tend to wear their races unevenly because of the fact that the swiveling movement of the stub shaft is for the most part through such a small arc that the travel of each individual roller along its race is less than the distance between lines of contact of adjacent individual rollers so that certain parts of the bearing races receive no wear whatsoever while other parts receive excessive wear. It has been found that in the case of a heavy vehicle receiving hard usage this results in a very short time in the wear upon the bearing races producing such an unevenness that excessive shimmying of the steered wheels occurs and the bearing must be replaced in order to correct the situation.

It is an object of the present invention to provide a bearing capable of taking relatively great thrust loads and having substantially the ease of movement of the usual anti-friction bearing yet which when employed in service requiring only small arcs of rotation will not wear in such a manner as to produce an uneven radial bearing surface.

Another object of this invention is to provide a bearing which may be employed as a king pin bearing for the stub axle shafts of motor vehicles and the like which will not wear in such a manner as to produce shimmying of the steered wheels of the vehicle.

Another object of this invention is to produce a long life, rugged bearing capable of standing up under hard usage and yet a bearing which is efficient and inexpensive.

Other objects and advantages of this invention will become apparent from the following description taken in connection with the accompanying drawing in which is set forth by way of illustration and example one embodiment of the invention:

In the drawings:

The single figure shows a vertical cross section through the king pin bearings of a motor vehicle one of which is illustrated as constructed in accordance with the present invention.

Referring more in detail to the drawing, the structure illustrated is one widely employed in connection with front wheel drive vehicles in which the hollow structural front axle is provided on each of its opposite ends with a spherical portion 1 having bosses 2 and 3 on its top and bottom extremities respectively, each boss carrying a short bearing pin such as illustrated at 4 in the lower part of this figure.

Surrounding each bearing pin are suitable washers 5 and 6.

Surrounding the spherical enlargements 1 are housing members which carry the stub axle shafts on which the steered wheels of the vehicle are mounted. Such housings are customarily formed of two parts such as the upper part 7 and the lower part 8. The upper part 7 is provided with substantially radial flanges 9 and the lower part 8 with mating flanges 10 so that the two parts 7 and 8 may be secured rigidly together by means of bolts 11 and nuts 12 extending through the flanges 9 and 10.

The upper portion 7 of the housing is provided with an upstanding cylindrical part 13 open at its upper end and adapted to be closed by means of a cover plate or cap 14. This cylindrical part is adapted to receive a bearing member in the manner presently to be described and the plate 14 is provided with a recess 15 in its under surface registering with the cylindrical interior of the part 13 and adapted to receive the upper portion of the bearing member.

The plate 14 is secured in place on the housing member 7 by means of cap screws 16 or the like and may be tapped to receive a grease fitting 17 or similar lubricating member.

Similarly the lower housing member 8 is provided with an internally cylindrical part 18, the lower end of which is adapted to be closed by means of a bearing retaining plate 19 having a recess 20 therein registering with the cylindrical part 18 and adapted to receive the lower end of a bearing member located in the part 18. The plate 19 may be secured in place on the housing 8 by means of cap screws 21 or the like.

For the purpose of providing a bearing member for the upper bearing pin it is unnecessary except in the case of very heavy vehicles to provide for great thrust loads because the weight of the vehicle and hence the major thrust load is taken by the lower bearing in this form of construction. Therefore, in the present instance there is illustrated an upper bearing which is merely in the form of a conical friction bearing having an outer bearing ring 22 with a tapered inner bearing surface and an inner bearing ring 23 fitting around the bearing pin and having an outer tapered bearing surface mating with the surface of the member 22. It is emphasized that this upper bearing is not a bearing constructed in accordance with the present invention because in most instances it is unnecessary to employ in this position a bearing of the nature of that provided by the present invention.

The bearing located in the lower part of the drawing is constructed in accordance with the present invention and is adapted to take tremendous thrust loads while being swung through small arcs without wearing in such a manner as to vary the tightness of the radial bearing during the swing.

The inner bearing member 24 of this bearing is formed of a suitable friction bearing material such as steel or the like and has an opening 25 therethrough adapted to fit snugly about the lower bearing pin 4 and be carried thereby. The exterior of this member 24 provides a cylindrical friction bearing surface 26.

The outer bearing member 27 is preferably formed of a different friction bearing material such as bronze for example, and is made of a cup-shape providing an inner cylindrical bearing surface 28 adapted to receive the exterior cylindrical bearing surface 26 on the bearing member 24. This inner bearing surface 28 is preferably provided with suitable oil grooves 29 so as to distribute lubricant freely thereover and taken with the surface 26 on the bearing member 24 provides a radial friction bearing of large area capable of taking substantial radial bearing loads.

In order to provide an anti-friction thrust bearing for taking the heavy thrust load imposed on a bearing in this application, the inner bearing member 24 is provided with an annular channel shaped bearing recess 30 which extends from the lower end portion of this bearing member upwardly a substantial portion of its length. The bottom of this annular bearing channel is provided with a bearing race 31 adapted to receive a plurality of ball bearings 32. These ball bearings 32 are located in the annular bearing recess without any ball retainers being employed, and the open end of the recess is provided with a bearing race ring 33 which serves to hold the balls 32 in place and provide a second race therefor. Thus the balls 32 are located between the axial extremities of the zone of contact between the surfaces 26 and 28. The ring 33 is preferably of a material similar in hardness to that of the bearing member 24, and is retained by means of a snap ring 34 mounted in a groove on the center extension of the bearing member 24.

The outer bearing member 27 preferably has an opening therethrough, the lower portion of this opening being adapted to receive the lower extending portion of the inner bearing member 24. Intermediate the upper and lower portions of the outer bearing member, however, it is formed with a radial shoulder 35 which engages the race ring 33 so as to transmit thrust forces from the inner bearing member 24 through the balls 32 and the ring 33 to the outer bearing member 27.

In operation, it has been found that the friction bearing between the surfaces 26 and 28, which takes the radial portion of the load on this king pin bearing is not subject to uneven wear even though used in this service in which the arc of turning of one part with respect to the other is very short. Hence, even after a substantial amount of use under adverse conditions it has been found that this radial friction portion of this bearing wears evenly and there is no tendency for the bearing to tighten and loosen as it rotates, even though it has received a great amount of wear. Because of this fact the steered wheels of a vehicle mounted with this bearing do not tend to shimmy even after a long period of service on the bearing.

On the other hand, all of the weight of the vehicle is taken by the anti-friction thrust bearing provided by the balls 32 and it has been found that whatever unevenness of wear takes place in the races of this ball bearing does not affect the smooth operation of the vehicle nor tend to cause shimmying thereof. Furthermore, by omitting the use of a ball retainer for the balls 32 it has been found that there is less tendency for any unevenness of wear on the races in which these balls run.

It will be appreciated that while this bearing has been primarily designed for and shown in connection with its use as a bearing for a king pin of a vehicle, it is not limited to such use but is applicable to any situation in which a bearing is required which will not wear unevenly on its radial bearing surfaces even though the arc through which it turns may be small, and yet in which a bearing is required which will take large thrust loads in substantially the fashion of an anti-friction bearing.

Thus, a means has been provided for carrying out and accomplishing all of the objects and advantages sought by this invention.

Having described the invention, what is claimed is:

1. In a bearing, a pair of bearing members having one portion of their mutually opposed surfaces in radial friction bearing engagement with each other, one of said members having an axially open annular bearing recess providing a bearing race in its bottom surface, an annular bearing race member having a part projecting into said recess and providing a bearing race opposed to said first bearing race, and a part projecting from said recess and adapted to rest upon the other of said bearing members, and rolling thrust bearing means interposed between said bearing races, said last mentioned bearing member having a part receiving that portion of the bearing race member which projects from said recess for transmitting thrust stresses thereto and retaining means engaging said first mentioned bearing member and said bearing race member for retaining said bearing race member in said recess.

2. In a bearing, inner and outer bearing members of different bearing materials, the material of one of said members being relatively softer than that of the other said members, said members having opposed cylindrical surfaces in close fitting sliding contact with each other to provide a friction bearing for taking radial loads and having opposed substantially radial surfaces, the substantially radial surface of the harder of said bearing members having a bearing race formed therein, a bearing race member of a material of substantially the same hardness as the harder of said bearing members in engagement with the substantially radial surface of the softer of said bearing members and having a bearing race formed therein opposed to said first mentioned bearing race, rolling bearing members between said opposed bearing races and in bearing engagement therewith to provide an anti-friction bearing for taking axial thrust loads, and retaining means engaging the bearing member which is constructed of the harder material and also engaging the bearing race member for retaining said race member in position.

3. In a bearing, an outer bearing member having an axial bore therethrough with the upper end of said bore being enlarged to provide an annular internal shoulder therein, an inner bearing member fitting within the upper portion of the bore of the outer member and having its exterior surface in close fitting sliding contact with the inner surface of said outer member to form a friction bearing for taking radial loads, the inner bearing member having an annular channel in its underside overlying the annular shoulder of the outer member, whereby the base of the channel provides a raceway opposed to the annular shoulder of the outer member, and rolling bearing elements between the opposed annular raceway and the shoulder and in bearing relation thereto to provide an anti-friction bearing for taking axial thrust loads.

4. In a bearing, an outer bearing member having an axial bore therethrough with the upper end of said bore being enlarged to provide an annular internal shoulder therein, an inner bearing member fitting within the upper portion of the bore of the outer member and having its exterior surface in close fitting sliding contact with the inner surface of said outer member to form a friction bearing for taking radial loads, the inner bearing member having an annular channel in its underside overlying the annular shoulder of the outer member, whereby the base of the channel provides a raceway opposed to the shoulder of the outer member, rolling bearing elements between the opposed annular raceway and the shoulder and in bearing relation thereto to provide an anti-friction bearing for taking axial thrust loads, and a central depending extension on the inner member extending downwardly within the lower portion of the bore of the outer member and below the annular raceway within the outer member to confine the bearing elements.

5. In a bearing, an outer bearing member having an axial bore therethrough with the upper end of said bore being enlarged to provide an annular internal shoulder therein, an inner bearing member fitting within the upper portion of the bore of the outer member and having its exterior surface in close fitting sliding contact with the inner surface of said outer member to form a friction bearing for taking radial loads, the inner bearing member having an annular channel in its underside overlying the annular shoulder of the outer member, whereby the base of the channel provides a raceway opposed to the shoulder of the outer member, a bearing race ring on the annular shoulder of the outer bearing member, rolling bearing elements between the ring and the raceway formed within the channel of the inner member, and a tubular extension on the inner bearing member extending downwardly into the lower portion of the bore of the outer member below the bearing race ring for confining said ring and the bearing elements.

6. A bearing as set forth in claim 5, together with retaining means engaging the inner bearing member extension and the bearing race ring for retaining said ring in position.

ALBERT THIBEAUX.

REFERENCES CITED

The following references are of record in the file of this patent:

UNITED STATES PATENTS

| Number | Name | Date |
| --- | --- | --- |
| 1,703,815 | Crane | Feb. 26, 1929 |
| 1,791,080 | Yeager | Feb. 3, 1931 |

FOREIGN PATENTS

| Number | Country | Date |
| --- | --- | --- |
| 210,527 | Germany | June 1, 1909 |
| 149,516 | Great Britain | July 30, 1919 |
| 48,372 | France | Feb. 3, 1938 |